US010035633B2

(12) United States Patent
Takahashi et al.

(10) Patent No.: US 10,035,633 B2
(45) Date of Patent: Jul. 31, 2018

(54) REUSABLE CONTAINER

(71) Applicant: HITACHI SYSTEMS, LTD., Tokyo (JP)

(72) Inventors: Jiro Takahashi, Tokyo (JP); Hirohide Aoyama, Tokyo (JP); Yasuhiro Ito, Tokyo (JP); Hirofumi Akiyama, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 0 days.

(21) Appl. No.: 13/956,683

(22) Filed: Aug. 1, 2013

(65) Prior Publication Data

US 2013/0313151 A1    Nov. 28, 2013

Related U.S. Application Data

(63) Continuation of application No. PCT/JP2012/052332, filed on Feb. 2, 2012.

(30) Foreign Application Priority Data

Feb. 4, 2011    (JP) .................................. 2011-022312

(51) Int. Cl.
*B65D 81/02*    (2006.01)
*B65D 61/00*    (2006.01)
(Continued)

(52) U.S. Cl.
CPC ............. *B65D 61/00* (2013.01); *B65D 19/06* (2013.01); *B65D 77/0453* (2013.01);
(Continued)

(58) Field of Classification Search
CPC ................... B65D 61/00; B65D 85/68; B65D 2585/6837; B65D 19/44; B65D 19/385;
(Continued)

(56) References Cited

U.S. PATENT DOCUMENTS 262,312 A * 8/1882 Rearden ..................... 312/280
1,355,647 A * 10/1920 Breakstone ................. 220/503
(Continued)

FOREIGN PATENT DOCUMENTS

CN    2818381 Y    9/2006
JP    56-23464 A    3/1981
(Continued)

OTHER PUBLICATIONS

International Search Report dated May 1, 2012, issued in corresponding application No. PCT/JP2012/052332.
Office Action dated Aug. 4, 2014, issued in corresponding Chinese Patent Application No. 201280007620.7, with English Translation (9 pages).

*Primary Examiner* — Anthony Stashick
*Assistant Examiner* — James M Van Buskirk
(74) *Attorney, Agent, or Firm* — Oliff PLC (57) ABSTRACT

An object to be packaged is positioned and secured on a set rack, and the set rack is placed on a buffer material provided on a bottom plate of an inner packaging cover. Right/left cover portions of the inner packaging cover are folded up at folding lines so that the inner packaging cover covers the set rack, and the set rack is placed on a bottom panel of the outer packaging case with the inner packaging cover therebetween. Thereafter, an open/close panel is slid along a guide groove formed on a side opening of the outer packaging case so as to close the side opening by the open/close panel, and an upper opening is covered by a top plate panel to thereby store the object to be packaged in the outer packaging case using the inner packaging cover and the set rack.

10 Claims, 9 Drawing Sheets

(51) Int. Cl.
*B65D 19/06* (2006.01)
*B65D 77/04* (2006.01)
*B65D 85/68* (2006.01)
*B65D 81/05* (2006.01)

(52) U.S. Cl.
CPC ............. *B65D 81/05* (2013.01); *B65D 85/68* (2013.01); *B65D 2519/00034* (2013.01); *B65D 2519/00069* (2013.01); *B65D 2519/0081* (2013.01); *B65D 2519/00139* (2013.01); *B65D 2519/00174* (2013.01); *B65D 2519/00208* (2013.01); *B65D 2519/00243* (2013.01); *B65D 2519/00338* (2013.01); *B65D 2519/00452* (2013.01); *B65D 2519/00606* (2013.01); *B65D 2519/00626* (2013.01); *B65D 2519/00641* (2013.01); *B65D 2519/00666* (2013.01); *B65D 2519/00701* (2013.01); *B65D 2519/00711* (2013.01); *B65D 2519/00791* (2013.01); *B65D 2519/00805* (2013.01); *B65D 2519/00965* (2013.01); *B65D 2585/6897* (2013.01); *Y02W 30/807* (2015.05)

(58) Field of Classification Search
CPC .... B65D 19/02; B65D 81/054; B65D 81/051; B65D 81/107; B65D 19/06; B65D 81/05; B65D 77/0453; B65D 2519/0081; B65D 2519/00338; B65D 2519/00606; B65D 2519/00626; B65D 2519/00641; B65D 2519/00666; B65D 85/64; B65D 2585/647; B65D 2585/6897; B65D 81/03; B65D 81/022; B25H 3/028; A47B 88/44; A47J 47/12
USPC ........ 220/23.89, 23.87, 23.83, 23.86, 1.5, 8; 206/600, 386, 521, 320, 526, 523, 576; 217/36
See application file for complete search history.

(56) References Cited

U.S. PATENT DOCUMENTS

| | | | | |
|---|---|---|---|---|
| 1,607,711 | A * | 11/1926 | Walker | 217/69 |
| 1,791,369 | A * | 2/1931 | Munroe et al. | 217/36 |
| 2,355,804 | A * | 8/1944 | Hutchinson | 206/594 |
| 3,356,209 | A * | 12/1967 | Pezely, Jr. | 206/523 |
| 3,809,234 | A * | 5/1974 | Kurick | 206/448 |
| 3,891,086 | A * | 6/1975 | Isaacs | B65D 57/00 206/320 |
| 4,339,039 | A * | 7/1982 | Mykleby | B65D 81/107 206/523 |
| 4,398,212 | A | 8/1983 | Serry et al. | |
| 4,851,286 | A * | 7/1989 | Maurice | B32B 5/32 206/523 |
| 4,890,764 | A * | 1/1990 | Rossini | B65D 81/26 137/571 |
| 5,271,499 | A * | 12/1993 | Van Horssen | 206/335 |
| 5,902,025 | A * | 5/1999 | Yu | A47B 88/0455 312/109 |
| 6,640,573 | B1 * | 11/2003 | Lee | 62/266 |
| 6,675,969 | B1 * | 1/2004 | Kiyohara | B65D 5/0095 206/448 |
| 6,726,413 | B1 * | 4/2004 | Stelson et al. | 409/132 |
| 7,328,804 | B2 * | 2/2008 | Andre | B65D 19/12 206/386 |
| 2004/0094448 | A1 * | 5/2004 | Koike | B65D 5/5088 206/521 |
| 2004/0232021 | A1 | 11/2004 | Linton | |
| 2008/0197266 | A1 * | 8/2008 | Fournier | 249/187.1 |

FOREIGN PATENT DOCUMENTS

| | | |
|---|---|---|
| JP | 06-100030 A | 4/1994 |
| JP | 09-099783 A | 4/1997 |
| JP | 2000-79941 A | 3/2000 |
| JP | 3068497 U | 5/2000 |
| JP | 2009-241933 A | 10/2009 |

* cited by examiner

REUSABLE CONTAINER

CROSS REFERENCE TO RELATED APPLICATION

This application is a continuation of International application No. PCT/JP2012/052332, filed on Feb. 2, 2012, the contents of which are incorporated herein by reference.

The present application is based on and claims priority of Japanese patent application No. 2011-022312 filed on Feb. 4, 2011, the entire contents of which are hereby incorporated by reference.

BACKGROUND OF THE INVENTION

Field of the Invention

The present invention relates to a reusable container for packaging objects having various shapes and sizes for transportation, and especially relates to a reusable container capable of being assembled easily and capable of being reused.

Description of the Related Art

Various containers have conventionally been known for packaging objects during transportation of objects and the like. Various types of containers are provided in response to the forms of objects being packed therein (hereinafter also referred to as object to be packaged). For example, in transporting precision machinery such as a passbook entry module of an ATM (Automated Teller Machine), the machinery is heavily packaged to realize toughness against impact, dust-proof performance against dusts and foreign matter, and shock-absorbing properties. In the prior art, these types of precision machinery have been packaged for example by embedding buffer materials in a cardboard box having the object stored therein, and further packaging the cardboard box by covering the outer side via a wooden frame formed by assembling panel members in a frame shape. However, according to such conventional packaging method, it requires much work to assemble and disassemble the wooden frame, so that it cannot correspond to resource-saving needs since the cardboard box, the buffer material and the wooden frame formed of different materials cannot be reused, and efficient packaging operation cannot be realized since the separation of refuse during disposal requires much work in addition to the assembling operation during packaging and the disassembling operation thereof.

Recently, there have been provided assembled containers that can be repeatedly reused for packaging. Various types of assembled containers are known in response to the shapes and sizes of the equipment being packaged, examples of which are a box-shaped container formed by molding aluminum alloy or other light metal, or an assembled container formed of synthetic resin disclosed for example in Japanese Patent Laid-Open Publication No. 2000-79941 (Patent Document 1). The assembled container shown in Patent Document 1 has face panels constituting the respective faces of the container formed of PP panels, wherein four side wall panels are connected in a foldable manner to four sides of the bottom panel, and wherein the respective face panels are assembled in a box shape during packaging to pack the object to be packaged.

However, even by using the reusable assembled container disclosed in Patent Document 1, in order to transport a precision machiner or the like, for example, a tough frame body for protecting the precision machinery from impact, a cover for preventing dusts or foreign objects from entering and a buffer material for absorbing impact are required in addition to the assembled container, and especially, in transporting a passbook entry module, excessive work was required to embed buffer materials to the space formed between the container and the passbook entry module in order to protect the passbook entry module from the impact applied thereto during transportation, so that there were demands for a reusable container capable of reusing a tough container having sufficient toughness, a dustproof cover and a buffer material, which realizes superior shock-absorbing effects and superior packaging operability.

SUMMARY OF THE INVENTION

The present invention aims at solving the problems of the prior art mentioned above by providing a reusable container enabling to reuse the tough frame body for protecting the object being packaged from impact or the like, the protection cover, the buffer material and the container for packaging the object, which has a superior packaging operability and which can be assembled easily.

A reusable container according to the present invention includes a set rack composed of a base plate for positioning and retaining an object to be packaged and a reinforcing frame, an inner packaging cover having a rectangular parallelepiped shape for covering the set rack, and an outer packaging case having a rectangular parallelepiped shape for housing the inner packaging cover, wherein the reusable container has the object to be packaged positioned and secured on the base plate, and further has rails provided between the inner packaging cover and the outer packaging case for guiding and pulling out the inner packaging cover.

According to the reusable container of the present invention, the object to be packaged is positioned and secured on the base plate constituting the bottom surface of the set rack, and then the set rack covered by the inner packaging cover, so that the set rack to which the object to be packaged is secured is housed via the inner packaging cover to the outer packaging case. The inner packaging cover is supported via rails disposed on the inner side of the outer packaging case.

The base plate of the set rack for positioning and retaining the object to be packaged in the reuse container of the present invention has a rectangular shape, and the reinforcing frame is a reinforcing frame arranged to correspond to each side of a rectangular parallelepiped shape, one side of which is composed of the rectangular shape of the base plate.

According to the reusable container of the present invention, the inner packaging cover can be repeatedly reused, and since the set rack has a rectangular bottom base plate, and the reinforcing frame is a rectangular parallelepiped having the rectangular base plate constituting one side thereof, the reusable container provided by the present invention can be utilized regardless of the shape or the size of the object to be packaged therein.

The inner packaging cover of the rectangular parallelepiped shape of the reuse container according to the present invention is composed of a single continuous synthetic resin sheet, having a pair of left and right box-shaped cover portions connectedly disposed to open and close via folding lines from a center area of upright plates folded up from a bottom panel, and wherein multiple buffer materials are bonded to and arranged on an upper surface of the bottom panel and an inner surface of the cover portions.

According to the reusable container of the present invention, the inner packaging cover can be repeatedly reused, and by placing the set rack having the object to be packaged secured thereto on multiple buffer materials disposed on the bottom panel of the inner packaging cover, and folding up a pair of left and right cover portions from the folding lines formed to the middle section of the upright plates so as to cover the set rack with the inner packaging cover, the base plate of the set rack can be supported by the buffer material disposed on the base plate and the buffer material secured to the inner surface of the cover portions can come into contact with the reinforcing frame of the set rack.

The outer packaging case having the rectangular parallelepiped shape of the reusable container according to the present invention is composed of a plurality of synthetic resin panels, wherein the respective panels are assembled to form a box shape with one side surface and upper surface of the rectangular parallelepiped shape capable of being opened and closed, the side opening of the outer packaging case has a pair of left and right guide grooves formed thereto, the side opening being allowed to open and close via an open/close panel sliding along the pair of guide grooves, the upper opening being covered via a ceiling panel to constitute the outer packaging case, and rails for guiding and pulling out the inner packaging cover housing the set rack are arranged on an inner side of the outer packaging case, and wherein the inner packaging cover is housed in the outer packaging case.

According to the reusable container of the present invention, when housing the inner packaging cover storing the set rack in which the object to be packaged is set in the outer packaging case, the set rack is placed on the buffer material disposed on the bottom panel, and the inner packaging cover is inserted from the side opening of the outer packaging case and the open/close panel is slid along the guide groove facing the side opening, so that the side opening is covered by the open/close panel, and thereafter, the upper opening of the outer packaging case is closed via the top plate panel, according to which the inner packaging cover is housed in the outer packaging case. Thereby, the object to be packaged can be protected both by the inner packaging cover and the outer packaging case.

According further to the present invention, the reusable container has a set rack composed of a rectangular base plate and a reinforcing frame arranged on respective sides of a rectangular parallelepiped having one surface composed of the rectangular base plate, the set rack having an object to be packaged positioned and retained thereon and being covered by an inner packaging cover having a rectangular parallelepiped shape, the inner packaging cover further housed in an outer packaging case having a rectangular parallelepiped shape, wherein a pair of left and right guide grooves are formed on a side opening of the outer packaging case, the side opening being allowed to open and close via an open/close panel sliding along the pair of guide grooves, and an upper opening being covered by a ceiling panel to constitute the outer packaging case, and wherein rails are arranged on an inner side of the outer packaging case for guiding and pulling out the inner packaging cover from the outer packaging case.

According to the reusable container of the present invention, the inner packaging cover can be repeatedly reused, and the inner packaging cover can be easily inserted to or pulled out from the outer packaging case.

DETAILED DESCRIPTION OF THE PREFERRED EMBODIMENTS

Now, a best mode for carrying out the present invention will be described with reference to FIGS. 1 through 9. In the present embodiment, an example is illustrated where the container is optimized for packaging a passbook entry module of an ATM (Automated Teller Machine) as the object to be packaged, but the present invention is not limited to packaging specific devices as the object, and the invention can be applied to packaging other objects not illustrated in the embodiments.

A reusable container 1 is composed of a set rack 10 having a rectangular parallelepiped shape in which an object to be packaged (passbook entry module) A is set, positioned and retained, an inner packaging cover 20 having a rectangular parallelepiped shape with a buffer material for protecting the set rack 10, and an outer packaging case 50 having a rectangular parallelepiped shape for further packaging the inner packaging cover 20.

Figure 5:
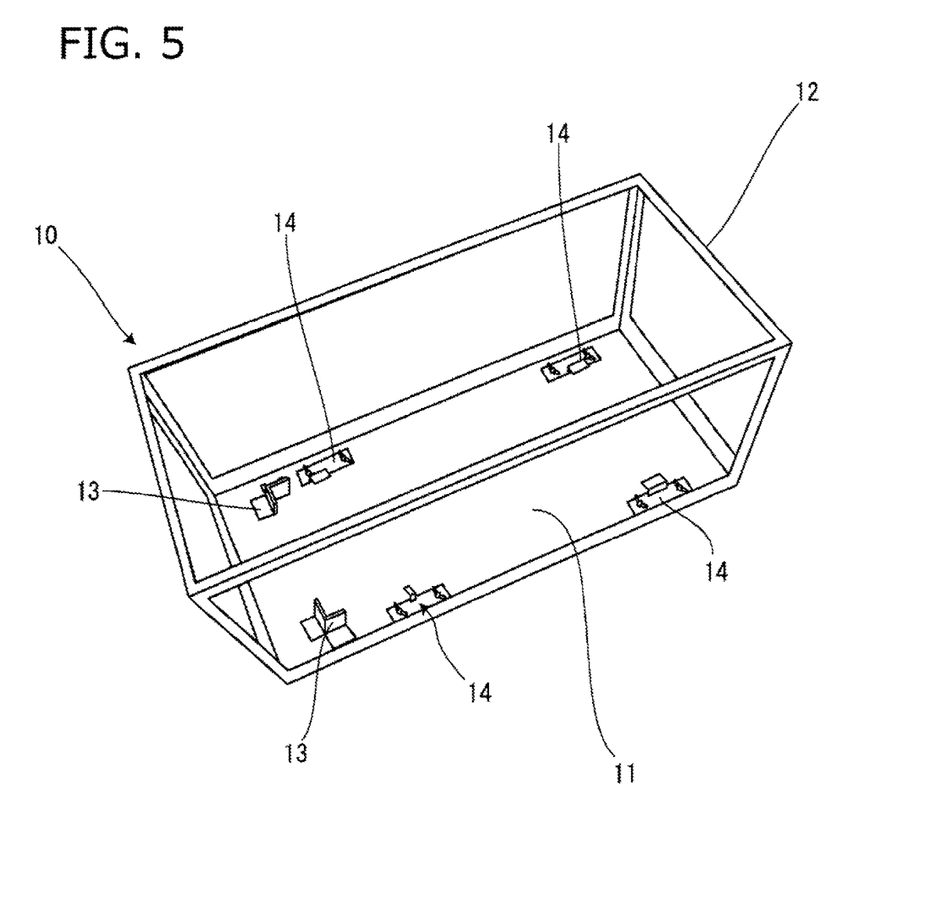
FIG. 5 is a perspective view showing the arrangement of a set rack according to the present embodiment.

As shown in FIG. 5, for example, the set rack 10 is composed of a metallic base plate 11 having a rectangular shape as a whole, and a reinforcing frame 12 having a rectangular parallelepiped shape erected from the four corners of the rectangular base plate 11 and having the rectangular base plate constitute one surface thereof, wherein the base plate 11 has attached thereto L-shaped brackets 13 for positioning an object to be packaged A and attachment brackets 14 for securing the object to be packaged A, and as illustrated in FIG. 5, in the state where the two corners at one end of the object to be packaged A is positioned by the L-shaped brackets 13, the attachment brackets 14 are latched to rails 15 disposed on the side portions of the object to be packaged A, the attachment brackets 14 are screwed onto the base plate 11, and then the reinforcing frame 12 is secured to the base plate 11 via screws or other appropriate means.

Figure 7:
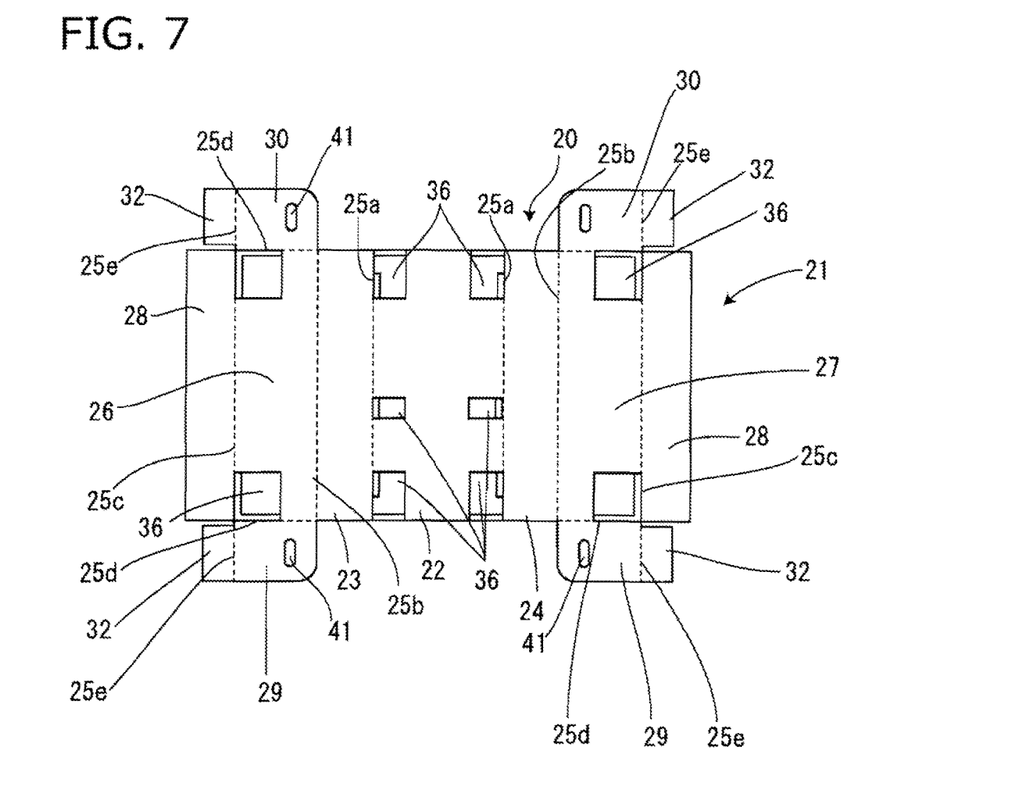
FIG. 7 is a development view of the inner packaging cover according to the present embodiment.
Figure 8:
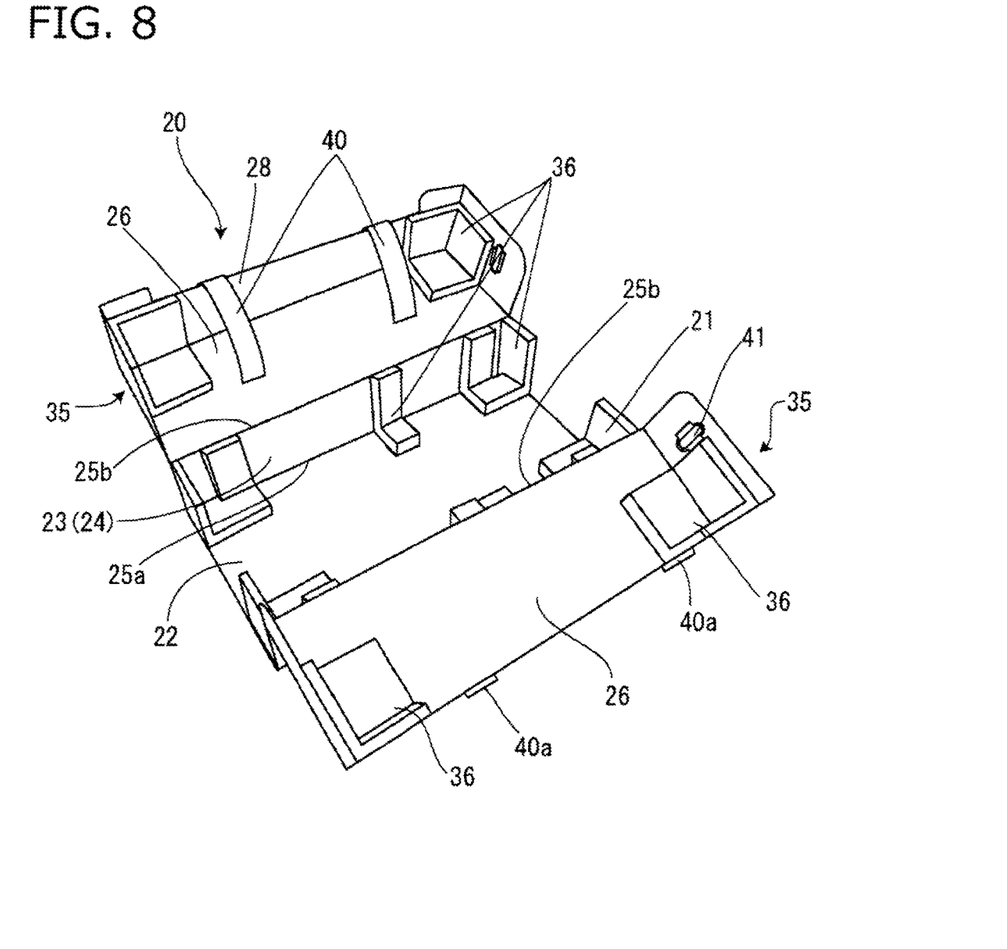
FIG. 8 is a perspective view showing the assembled state of the inner packaging cover according to the present embodiment.

As shown in the development view of FIG. 7, the folding lines of the inner packaging cover 20 are shown by dotted lines. The inner packaging cover 20 is formed of a single continuous synthetic resin sheet 21, wherein left and right upright plates 23 and 24 are connectedly disposed via folding lines 25a on a bottom plate 22, and further, a left side wall plate 26, a right side wall plate 27, ceiling plates 28, front side plates 29, rear side plates 30, and pasting margins 32 are connectedly disposed on the upright plates 23 and 24 via folding lines 25b, 25c, 25d and 25e. By perpendicularly folding the front side plates 29, the rear side plates 30 and the pasting margins 32 at the folding lines 25d and 25e, and folding the ceiling plates 28 at right angles from the folding lines 25c and securing the pasting margin 32 to the ceiling plates 28 via riveting or the like, a pair of box-shaped cover portions 35 on left and right sides are formed by the left side wall plate 26, the right side wall plate 27, the front side plates 29, the rear side plates 30 and the ceiling plates 28 (FIG. 8). Buffer materials 36 having L-shaped cross-sections for positioning the set rack 10 are secured to the inner sides of the cover portions 35 and the bottom plate 22 at positions corresponding to each corner of the set rack 10 and at the center of both side edges of the set rack 10. Further, on the outer surface of the ceiling plate 28 are attached hook and loop fasteners 40 for securing the cover portions 35 in a closed state, and on the front side plates 29 and rear side plates 30 are formed slits 41 for handles.

Figure 1:
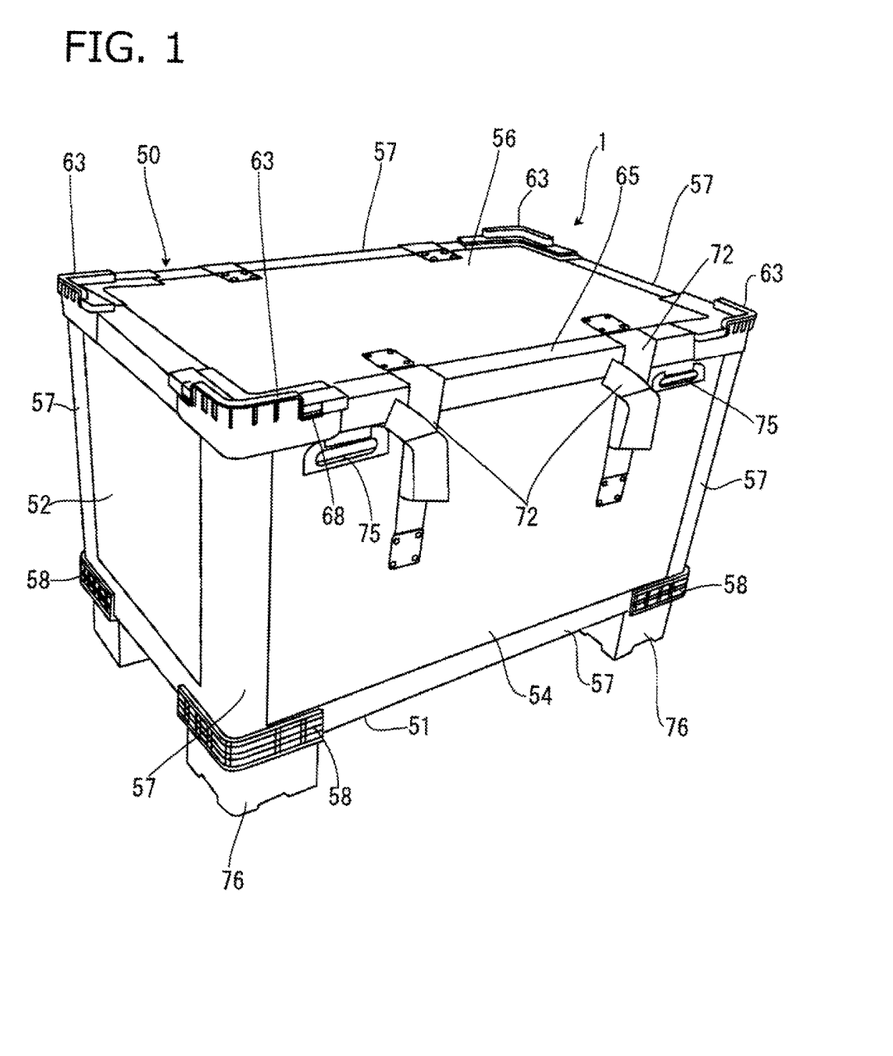
FIG. 1 is a perspective view of a reusable container according to one preferred embodiment of the present invention.
Figure 2:
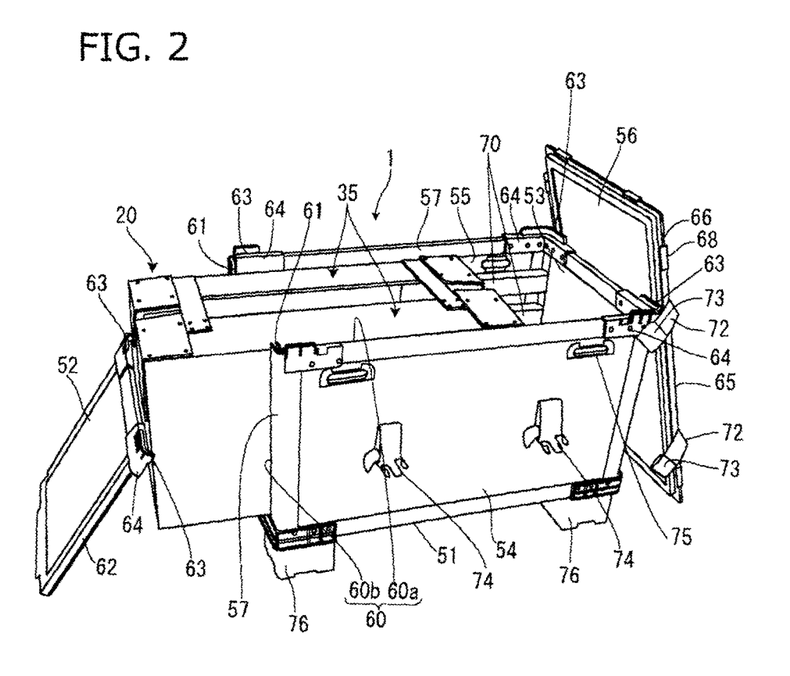
FIG. 2 is a perspective view showing an opened state of the reusable container according to the preferred embodiment.
Figure 3A:
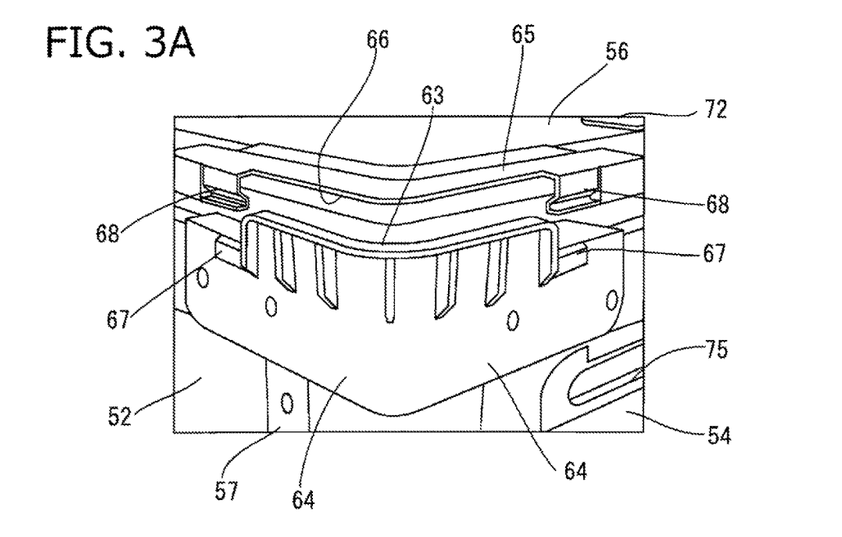
FIG. 3A is a perspective view of a relevant portion showing the open/close state of a ceiling panel according to the preferred embodiment, wherein the ceiling panel is opened.
Figure 3B:
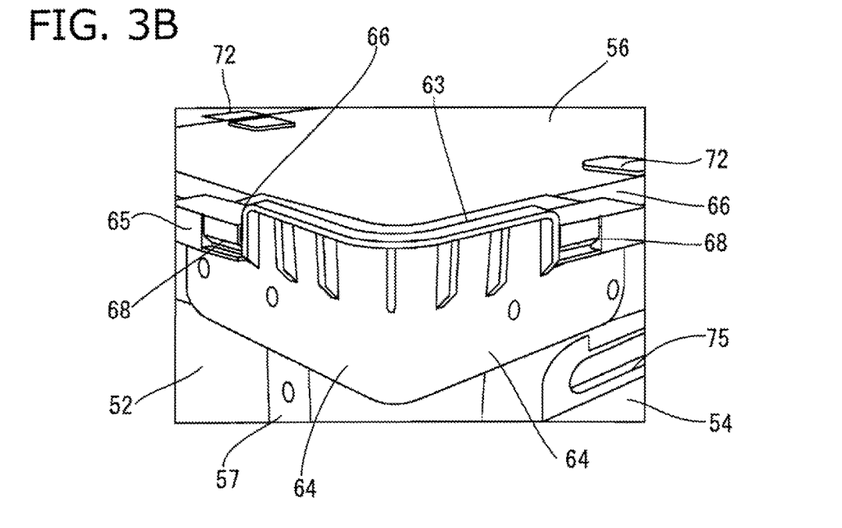
FIG. 3B is a perspective view of a relevant portion showing the open/close state of a ceiling panel according to the preferred embodiment, wherein the ceiling panel is closed.

An outer packaging case 50 is composed of, as shown in FIGS. 1 and 2, a bottom panel 51 formed of synthetic resin such as PP (polypropylene) (which is not shown in FIGS. 1 and 2 since it is placed on the bottom side), an open/close panel 52 disposed on one of the left and right side walls (illustrated as being formed on the left side wall in FIG. 1 and opened in FIG. 2), a side wall panel 53 disposed on the opposite side therefrom (which is referred to as a right side wall panel 53 for convenience), a front side panel 54, a rear side panel 55 and a top plate panel 56. The respective panels 51 through 56 constituting the outer packaging case 50 have their outer edge portions reinforced via reinforcing frames 57. Corner members 58 are secured to the four corners of the bottom panel 51, and the front side panel 54, the rear side panel 55 and the right side wall panel 53 excluding the open/close panel 52 are secured to the corner members 58. According to such arrangement, an opening 60 in which the upper opening 60a and one of the side openings 60b (left side in the drawing) are connected is formed to the outer packaging case 50 by removing the open/close panel 52 and the top plate panel 56 (refer to FIG. 2). In other words, the reinforcing frames 57 disposed in a vertical direction (perpendicular direction in the state of FIG. 2) facing the side opening 60b has guide grooves 61 formed thereto for guiding the open/close panel 52, wherein by sliding insert portions 62 formed on both side edges of the open/close panel 52, the side opening 60a can be opened and closed, and the upper opening 60a can be opened and closed by the top plate panel 56.

As shown in FIGS. 1 through 3A and 3B, positioning frames 64 having L-shaped positioning projections 63 are secured to four corners of the side wall panels 52 through 55 (FIG. 2) facing the upper opening 60a of the outer packaging case 50, and the reinforcing frame 65 for reinforcing the circumference of the top plate panel 56 have cutout portions 66 corresponding to and fitting with the projections 63. Further, a pair of latched projections 67 is formed on each side of the projections 63 of the positioning frames 64, and elastic deformable hook pieces 68 are formed on the reinforcing frames 65 to the latched projections 67. The dimensions of the projections 63 are designed so that when the top plate panel 56 is fit to the upper opening 60a of the outer packaging case 50, the projections 63 are protruded above the upper surface of the top plate panel 56.

Figure 4:
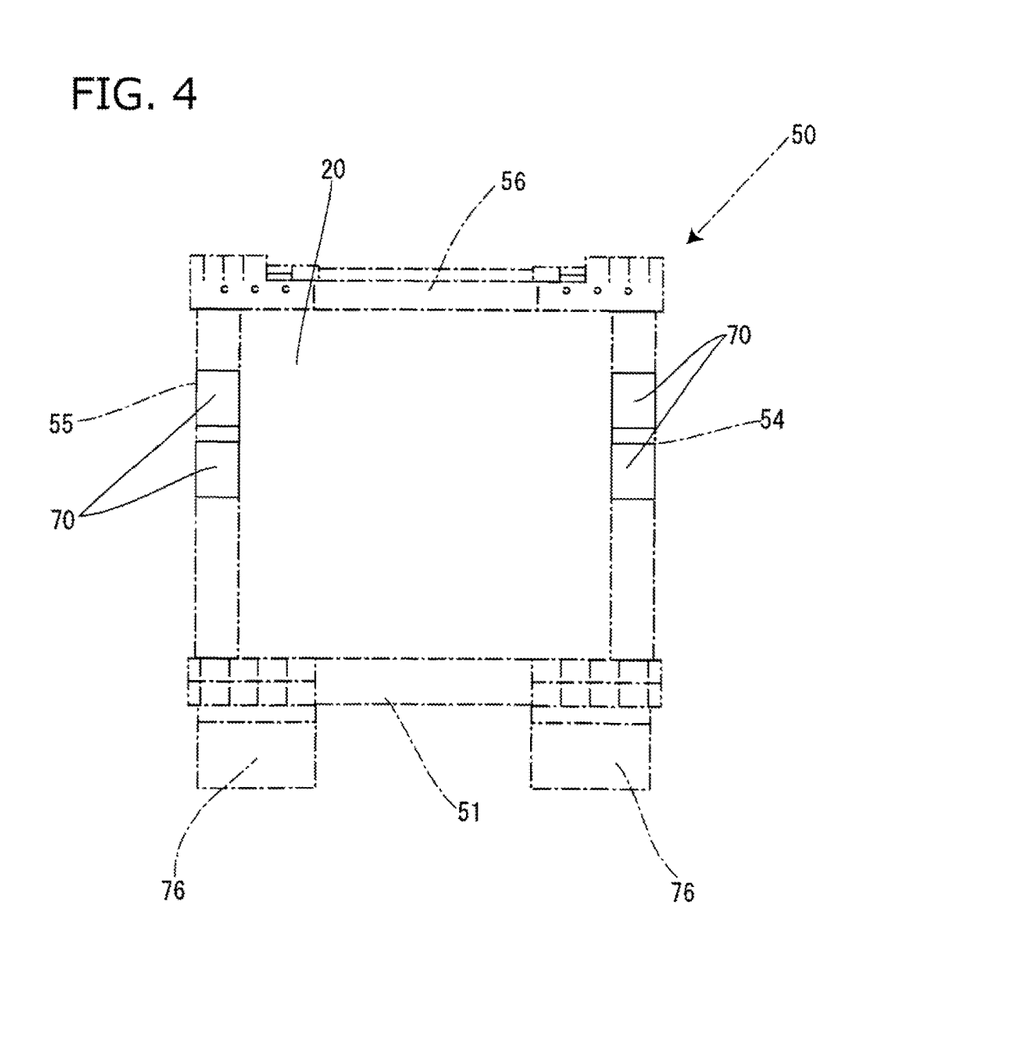
FIG. 4 is an explanatory view showing the state of arrangement of rails on an outer packaging case for guiding an inner packaging cover according to the present embodiment.

Further, as shown in FIG. 4, multiple guide rails 70 are secured to the inner sides of the front side panel 54 and the rear side panel 55 of the outer packaging case 50, and the outer side of the inner packaging cover 20 is guided by the guide rails 70 and moved in sliding motion. The outer packaging case 50 is secured in a state where binding members 73 fixed to both ends of fastening bands 72 are engaged to receiver clasps 74 fixed to the outer side of side wall panels 54 and 55 so that the outer packaging case 50 is closed tightly. Incidentally, reference number 75 in FIG. 1 and the like denotes a pair of openings as handles formed close to the upper frame of side wall panels 54 and 55, and reference number 76 denotes a support platform for forming insert openings used when carrying the outer packaging case 50 via forklifts or pallets.

Figure 6:
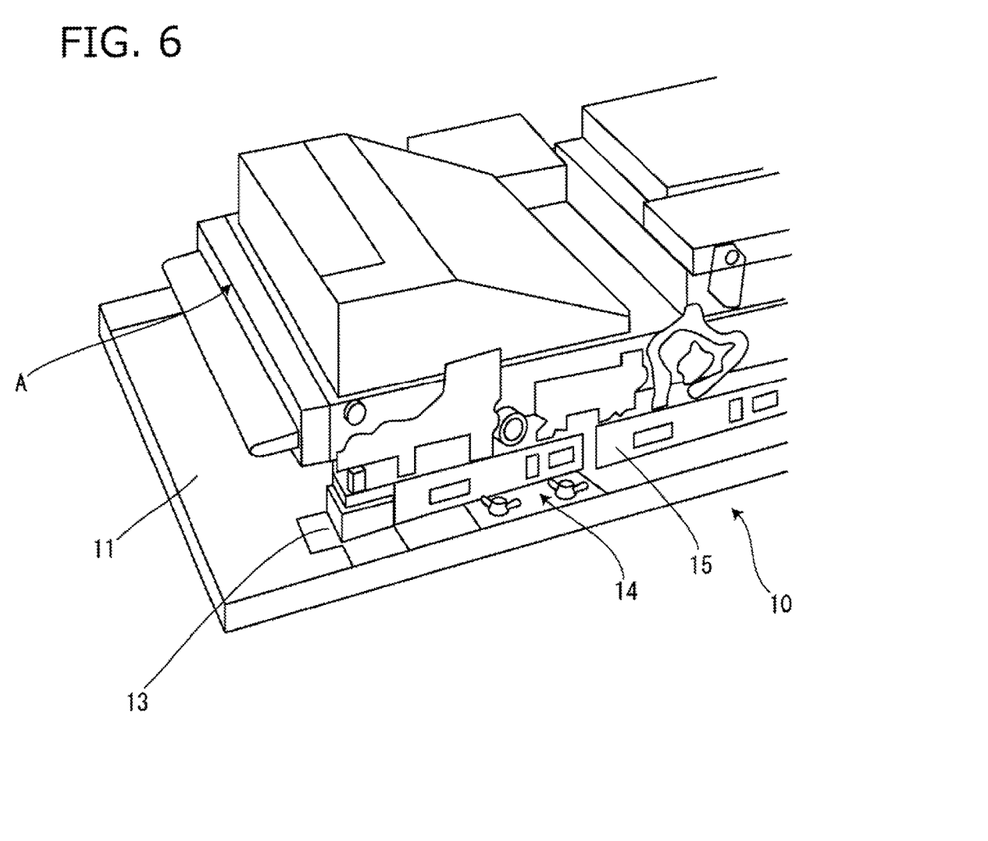
FIG. 6 is a perspective view showing a portion of an object to be packaged set on a base plate of a set rack according to the present embodiment.
Figure 9:
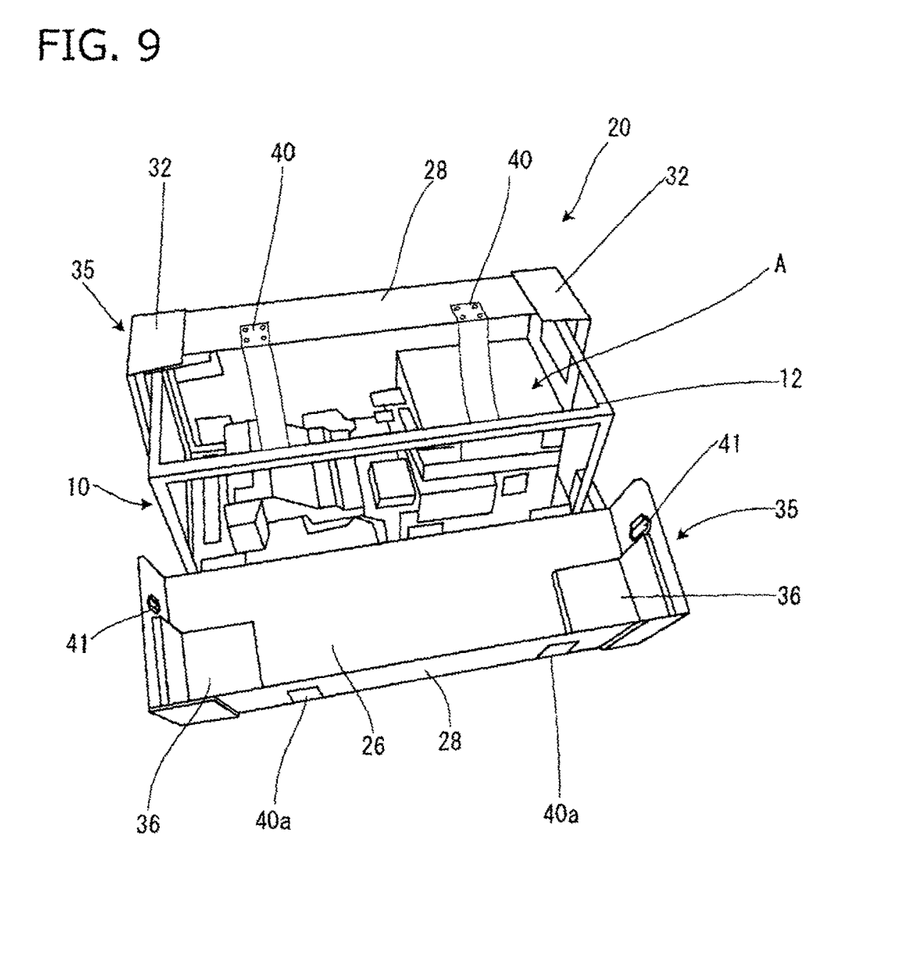
FIG. 9 is a perspective view showing a state where the set rack is stored in the inner packaging cover according to the present embodiment.

Now, we will describe the steps for assembling the reusable container 1 according to the present invention arranged as described above. At first, as shown in FIG. 6, the object to be packaged A is positioned via the L-shaped brackets 13 disposed on the base plate 11 of the set rack 10, the attachment brackets 14 are latched on rails 15 disposed on the sides of the object to be packaged A, the attachment brackets 14 are screwed onto the base plate 11 so as to position and secure the object to be packaged A on the set rack 10, and then the reinforcing frame 12 is screwed onto the base plate 11 of the set rack 10 so as to assemble the set rack 10. At this time, it is preferable to use rails for assembling the passbook entry module as the object to be packaged A to a banking terminal device as the rails 15 disposed on the sides of the object to be packaged A. Then, as shown in FIG. 9, after placing the set rack 10 with the object to be packaged A set thereto on the buffer material 36 disposed on the bottom plate 22 of the inner packaging cover 20 by attaching the hook and loop fasteners 40 fixed to one of the ceiling plates 28 while folding up the right/left cover portions 35 from the folding lines 25b of the inner packaging cover 20 to female hook and loop fasteners 40a fixed to the other ceiling plate 28, the right/left cover portions 35 are secured to the set rack 10 in the covered state. Thereafter, as shown in FIG. 2, the object to be packaged A secured to the set rack 10 is stored in the outer packaging case 50 in a state covered by the inner packaging cover 20. At this time, the inner packaging cover 20 is guided via rails 70 through the side opening 60b of the outer packaging case 50 and inserted thereto, and the set rack 10 is placed via the inner packaging cover 20 on the bottom panel 51. Then, by having the open/close panel 52 slide along the guide grooves 61 formed vertically on the reinforcing frame 57 facing the side opening 60b, the side opening 60b is closed via the open/close panel 52, and at the same time, the upper opening 60a of the outer packaging case 50 is closed via the top plate panel 56 while having the cutout portions 66 formed on the four corners of the top plate panel 56 fit to the L-shaped positioning projections 63 formed on the four corners of the respective side wall panels 52 through 55. Thus, the hook pieces 68 formed on the reinforcing frame 65 of the top plate panel 56 are elastically deformed and engaged to the latched projections 67 formed to the positioning frames 64 of the respective side wall panels 52 through 55, by which the top plate panel 56 is secured. Thereafter, the binding members 73 of the fastening bands 72 attached to the top plate panel 56 are engaged with the receiver clasps 74 secured to the side wall panels 54 and 55, so as to seal the outer packaging case 50. According to the above operation, the object to be packaged A is stored within the outer packaging case 50 and the packaging operation of the object to be packaged A is completed.

As described, according to the reusable container 1 of the present invention, the object to be packaged A is set in the set rack 10 and the inner packaging cover 20 is arranged to cover the set rack 10, so that any impact applied on the object to be packaged A can be absorbed via the buffer material 36 disposed in the inner packaging cover 20, and the object to be packaged A is protected by the inner packaging cover 20. By further housing the object to be packaged A covered by the inner packaging cover 20 in the outer packaging case 50, the vibration or impact that may be applied on the object to be packaged A being a precision component during transportation or the like can be absorbed effectively by the buffer material 36 in the inner packaging cover 20, and the transportation can be performed in an extremely safe manner. Conventionally, in packaging a precision machinery having a complex outer shape, such as a passbook entry module of an ATM as the object to be packaged, it was necessary to heavily pack the object by filling buffer materials in the space between the container and the object to be packaged A, but according to the present embodiment, the operation of filling buffer materials is not required, and the set rack 10 having a predetermined shape (rectangular parallelepiped) in which the object to be packaged A is secured should simply be covered by the inner packaging cover 20. Further, the outer packaging case 50 disposed on the outermost side packaging the object to be packaged A has an opening 60 formed of an upper opening 60a and a side opening 60b, and when loading the set rack 10 covered by the inner packaging cover 20 in the outer packaging case 50, there is no need to raise the object to be packaged A up high since the object to be packaged A can be loaded via sliding movement along rails 70 through the side opening 60b of the outer packaging case 50, so that the loading can be performed easily. As for the assembly operation of the outer packaging case 50 storing the object to be packaged A, by having the open/close panel 52 slide along the guide grooves 61 formed vertically on the reinforcing frame 57 facing the side opening 60b, and closing the upper opening 60a of the outer packaging case 50 via the top plate panel 56 by having the L-shaped positioning projections 63 formed on the four corners of the respective side wall panels 52 through 55 fit to the cutout projections 66 formed on the four corners of the top plate panel 56, the hook pieces 68 formed on the reinforcing frame 65 of the top plate panel 56 elastically deform and engage to the latched projections 67 formed on the positioning frames 64 and the top plate panel 56 can be secured easily. Therefore, the present invention not only enables to facilitate the packaging operation of the object to be packaged A, but also corresponds to needs regarding saving of resources since the set rack 10, the inner packaging cover 20 and the outer packaging case 50 for packaging the object to be packaged A can be used repeatedly. Further, the present invention provides a container having sufficient strength and rigidity during transportation of the object to be packaged A, which can be formed and processed easily, and which has reduced weight, so that the container can be handled easily.

The preferred embodiments of the present invention have been described in detail, but the present invention is not restricted to the embodiments described above, and various modifications are enabled within the scope of the present invention. For example, the passbook entry module of an ATM has been taken as an example of the object to be packaged A, but the present reusable container can be utilized widely for packaging various devices by preparing various types of attachment brackets for securing the various devices.

The effects of the present invention are as follows.

According to the present invention, even when it is necessary to pack a precision machinery having a complex outer shape as the object to be packaged, there is no need to embed buffer materials to the space formed between the outer packaging case and the object to be packaged, and it is simply necessary to secure the object to be packaged to the rectangular parallelepiped-shape set rack and to house the object to be packaged together with the inner packaging cover equipped with buffer materials covering the set rack to the outer packaging case, so that a reusable container that does not require buffer filling operations can be provided. Further, the present invention enables to transport the object to be packaged in an extremely safe manner by effectively absorbing the vibration and impact applied on the object during transportation by the buffer material disposed on the inner packaging cover and the buffer material disposed on the outer packaging case.

Furthermore, when loading the inner packaging cover storing the set rack on which the object to be packaged is set in the outer packaging case, the loading can be performed so that the inner packaging cover is slid horizontally through the side opening into the outer packaging case, so that there is no need to raise the inner packaging cover in which the object to be packaged is stored up high, and the loading operation is facilitated.

The outer packaging case for storing the object to be packaged has sufficient strength and rigidity, and the forming process thereof is easy. The outer packaging case made of synthetic resin is lightweight and can be handled easily, so that the work related to the packaging operation can be reduced and the time required for the packaging operation can be shortened.

What is claimed is:

1. A reusable container comprising:
    a set rack including:
        a base plate for positioning and retaining an object to be packaged, and
        a reinforcing frame defining a perimeter of each side of a rectangular parallelepiped shape, wherein the reinforcing frame, prior to being secured to the base plate, has each side entirely open
    an inner packaging cover having a rectangular parallelepiped shape corresponding to the rectangular parallelepiped shape of the reinforcing frame of the set rack for covering the set rack and multiple buffer materials for protecting the object being packaged from impact and vibration;
    an outer packaging case having a rectangular parallelepiped shape for housing the inner packaging cover; and
    rails disposed opposite from each other on two sides of the inner packaging cover, each located between the inner packaging cover and the outer packaging case, for guiding and pulling out the inner packaging cover in a horizontal direction.

2. The reusable container according to claim 1, wherein the inner packaging cover of the rectangular parallelepiped shape is composed of a single continuous synthetic resin sheet, having a pair of left and right box-shaped cover portions connectedly disposed to open and close via folding lines from a center area of upright plates folded up from a bottom panel, and wherein the multiple buffer materials are bonded to and arranged on an upper surface of the bottom panel and an inner surface of the cover portions.

3. The reusable container according to claim 1,
wherein the outer packaging case having the rectangular parallelepiped shape is composed of a plurality of synthetic resin panels,
wherein the respective panels are assembled to form a box shape with one side surface and upper surface of the rectangular parallelepiped shape capable of being opened and closed,
wherein a side opening of the outer packaging case has a pair of left and right guide grooves formed thereto, the side opening being enabled to open and close via an open/close panel sliding along the pair of guide grooves,
wherein an upper opening of the outer packaging case is covered by a ceiling panel, and
wherein the rails for guiding and pulling out the inner packaging cover are arranged on an inner side of the outer packaging case.

4. A reusable container comprising:
a set rack including a rectangular base plate and a reinforcing frame defining a perimeter of each side of a rectangular parallelepiped shape, wherein, prior to the reinforcing frame being secured to the base plate, each side of the reinforcing frame is entirely open, the set rack having an object to be packaged positioned and retained thereon and covered by an inner packaging cover having a rectangular parallelepiped shape corresponding to the rectangular parallelepiped shape of the set rack, the inner packaging cover further being housed in an outer packaging case having a rectangular parallelepiped shape, wherein a pair of left and right guide grooves are formed on a side opening of the outer packaging case, the side opening being enabled to open and close via an open/close panel sliding along the pair of guide grooves, and an upper opening being covered by a ceiling panel to constitute the outer packaging case; and
rails arranged on an inner side of the outer packaging case opposite from each other for guiding and pulling out the inner packaging cover from the outer packaging case in a horizontal direction.

5. The reusable container according to claim 2,
wherein the outer packaging case having the rectangular parallelepiped shape is composed of a plurality of synthetic resin panels,
wherein the respective panels are assembled to form a box shape with one side surface and upper surface of the rectangular parallelepiped shape capable of being opened and closed,
wherein a side opening of the outer packaging case has a pair of left and right guide grooves formed thereto, the side opening being enabled to open and close via an open/close panel sliding along the pair of guide grooves,
wherein an upper opening of the outer packaging case is covered by a ceiling panel, and
wherein the rails for guiding and pulling out the inner packaging cover are arranged on an inner side of the outer packaging case.

6. The reusable container according to claim 1, wherein the multiple buffer materials are bonded to and arranged on the inner packaging cover at positions corresponding to each corner of the base plate of the set rack so as to position the set rack within the inner packaging cover.

7. The reusable container according to claim 2, wherein the multiple buffer materials each have an L-shaped cross section.

8. The reusable container according to claim 4, wherein multiple buffer materials are bonded to and arranged on the inner packaging cover at positions corresponding to each corner of the base plate of the set rack so as to position the set rack within the inner packaging cover.

9. The reusable container according to claim 8, wherein the multiple buffer materials each have an L-shaped cross section.

10. The reusable container according to claim 1, wherein the multiple buffer materials each have an L-shaped cross section and are bonded to and arranged on the inner packaging cover at positions corresponding to each corner of the base plate of the set rack so as to position the set rack within the inner packaging cover.

* * * * *